Figure 3:
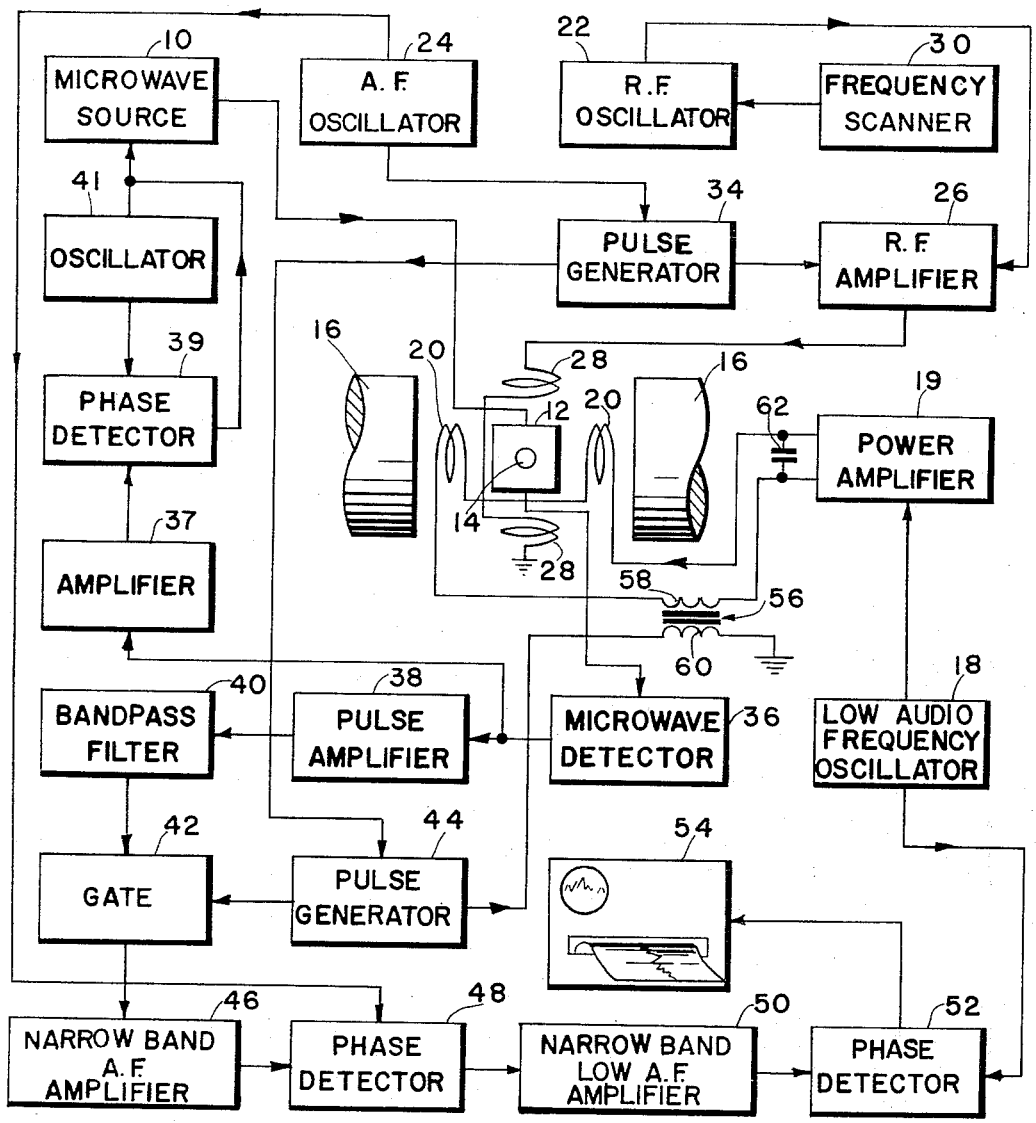

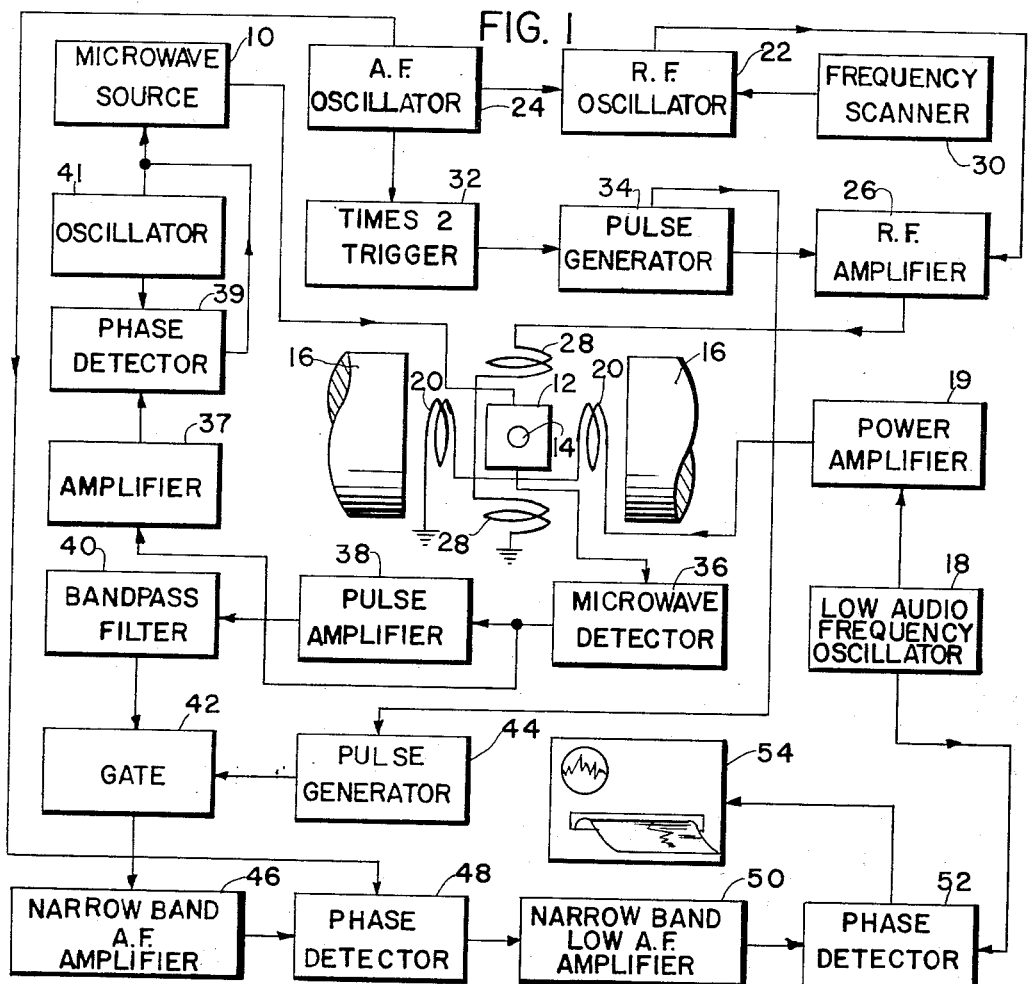

INVENTOR.
JAMES S. HYDE
ATTORNEY

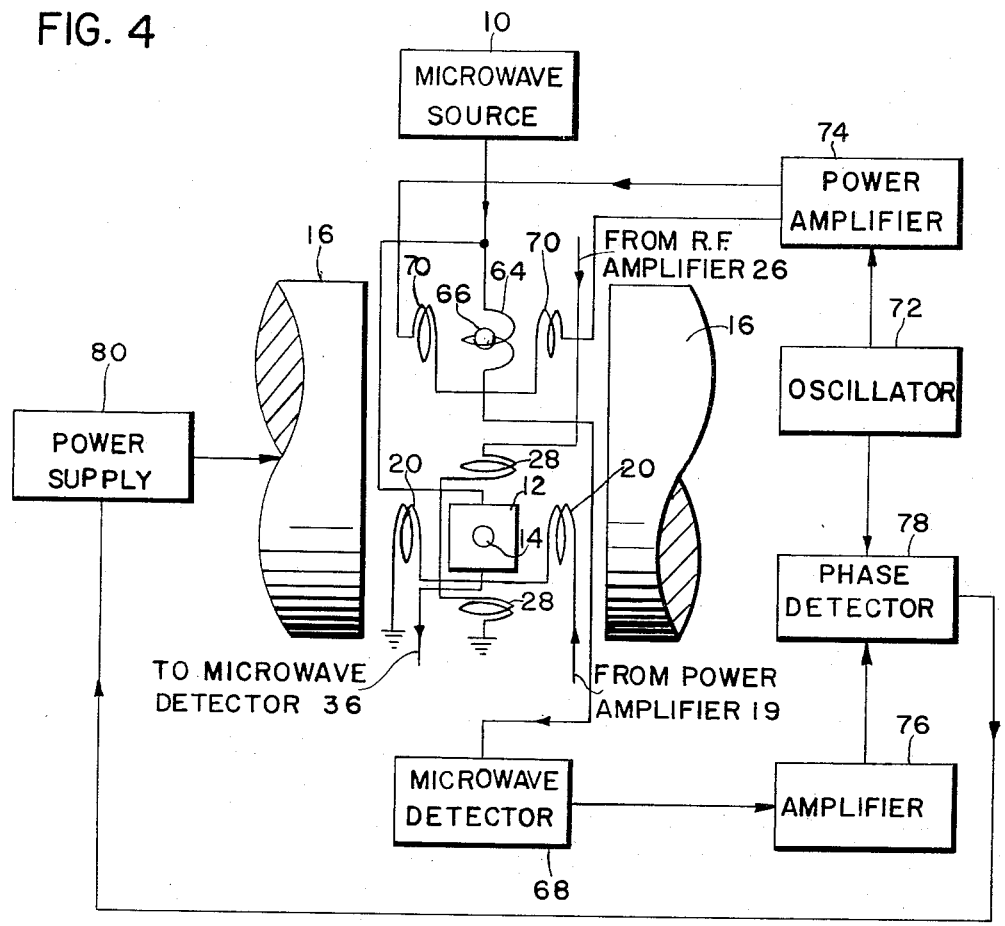

3,358,222
GYROMAGNETIC RESONANCE APPARATUS UTILIZING PULSED RF EXCITATION
James S. Hyde, Menlo Park, Calif., assignor to Varian Associates, Palo Alto, Calif., a corporation of California
Filed June 5, 1964, Ser. No. 372,973
11 Claims. (Cl. 324—.5)

This invention relates to gyromagnetic resonance and in particular to electron-nuclear double resonance phenomena.

Electron-nuclear double resonance experiments have been conducted in the past to study the interaction of nuclei that have a magnetic moment with electrons which are in a paramagnetic state. In such experiments, a sample to be investigated is subjected to a polarizing magnetic field $H_0$; to a radio frequency magnetic field $H_2$ with a frequency $\nu_2$ near the characteristic Larmor precession frequency $\nu_n$ of the nuclei, said field $H_2$ being for the purpose of inducing nuclear magnetic resonance (NMR) transitions; and to a second radio frequency magnetic field $H_1$ at the characteristic Larmor precession frequency of the electrons $\nu_e$, said field $H_1$ inducing electron paramagnetic resonance (EPR) transitions. The double resonance signal is obtained by observing the EPR signal, while sweeping the frequency $\nu_2$ through the condition of nuclear magnetic resonance ($\nu_2 = \nu_n$), and by monitoring the change in the EPR signal. This signal change occurs as a result of the interaction between the nuclei and the electrons. In this manner, the NMR signal is observed by variations in the EPR signal.

Heretofore, electron-nuclear double resonance experiments have employed relatively small radio frequency $\nu_2$ fields, having an amplitude, $H_2$, of approximately 1 gauss, for example. It would be very desirable to use radio frequency fields of relatively large magnitude. With higher fields, in the order of 100 gauss by way of example, analysis of many materials becomes more facile. Also, in many cases double resonance analysis can only be achieved at such high amplitude fields.

Generally, the radio frequency magnetic field $H_2$ at a frequency $\nu_2$ is linearly polarized at right angles to the DC polarizing magnetic field $H_0$. The electrons precess at a Larmor frequency determined by the vector sum of the radio frequency magnetic field $H_2$ and the polarizing field. Thus, when employing a large $H_2$ field, the precession frequency $\nu_e$ of the electrons is shifted. The amount of shift is approximately equal to $$H_2^2/2H_0$$

where $H_2$ is the R.F. field at the frequency $\nu_2$, and $H_0$ is the polarizing field. Any change in amplitude of the radio frequency field causes variations in the EPR signal, because the electron Larmor precession frequency $\nu_e$ is changed. It is very difficult to sweep the frequency $\nu_2$ and hold the amplitude of the radio frequency magnetic field sufficiently constant to remain at optimum conditions for observation of EPR signals. As a result, baseline drifts and instability occur together with an apparent increase in noise.

Also, (an additional problem experienced with double resonance experiments utilizing intense radio frequency fields is the excessive heating of metallic structures surrounding the sample to be analyzed. Such structures include the resonant microwave cavity employed in the EPR spectrometer, the pole pieces of the magnet which produce the polarizing field, and the radio frequency coil.

Another problem experienced with double resonance experiments utilizing intense radio frequency fields is the excessive heating of the sample to be analyzed.

Another problem arises from the spurious radio frequency interaction of the transmitter with the sensitive detection system required to sense the EPR signal. For example a one kilowatt transmitter may be located only a few feet away from a very sensitive EPR receiver. These spurious signals may enter the detection system by direct radiation, by ground currents, or in some other way.

An object of this invention is to provide a novel and improved apparatus that utilizes electron-nuclear double resonance.

Another object of this invention is to provide an improved gyromagnetic apparatus employing double resonance techniques wherein a high signal-to-noise ratio is achieved.

Another object is to provide an improved gyro magnetic resonance apparatus utilizing double resonance wherein a substantially high amplitude radio frequency field may be employed without baseline instability or spurious radio frequency interaction.

A further object is to provide compensation for the shift in polarizing field as a result of application of large R.F. fields.

In one embodiment of this invention, a sample is pulsed repetitively at a predetermined rate $f$ by a first train of pulses of radio frequency magnetic field, said field being oriented at right angles to the polarizing field $H_0$, said radio frequency being near the nuclear precession frequency $\nu_n$. The sample is also pulsed at the same predetermined rate $f$ by a second train of pulses of radio frequency magnetic field, said field being oriented at right angles to the polarizing field $H_0$, said radio frequency being near the nuclear precession frequency $\nu_n$ but different from the radio frequency employed in the first train of pulses. The pulses of the second train occur substantially midway between the pulses of the first train, and the pulses of each train are of substantially the same amplitude. The detection circuit includes a pulse amplifier, a bandpass filter, a gate opened synchronously with the pulses of each train, and a narrow band amplifier tuned to $f$. Such a detection circuit effectively subtracts the signals arising from the first train from the signals arising from the second train. In this manner, noise is effectively reduced, and any spurious signals dependent only on the amplitude of the radio frequency pulse and not on the particular radio frequency are eliminated. The detected signal is proportional to the difference in the electron nuclear double resonance signal at the radio frequency of the first train and the electron-nuclear double resonance signal at the radio frequency of the second train. By scanning the radio frequencies the electron-nuclear double resonance spectrum is obtained.

In an alternative embodiment, a bucking magnetic field $H_c$ that opposes the polarizing field is utilized to balance out the shift of the polarizing field arising from $H_2$ (said shift is approximately $\frac{1}{2}(H_2^2/H_0)$ as described above). The bucking field $H_c$ is pulsed at a low frequency rate, say $f$, synchronously with R.F. pulses and a receiver detection circuit is utilized to pass information at a frequency $f$. The detection circuit includes a bandpass filter, a gate opened synchronously with the R.F. pulses, and a narrow band amplifier tuned to $f$. In this manner noise is effectively reduced, and any spurious effects arising from the shift of the polarizing field caused by $H_2$ are eliminated.

In each of these embodiments, utilization of pulsed radio frequency fields rather than CW radio frequency fields permits very intense fields without excessive heating.

The invention will be described in greater detail with reference to the drawing in which:

FIG. 1 is a schematic and block diagram of one embodiment of the inventive double resonance apparatus;

FIGS. 2A–D are a series of waveforms to aid in the explanation of the invention;

FIG. 3 is a schematic and block diagram of an alternative embodiment of the invention; and FIG. 4 is a schematic and block diagram of a field frequency control that may be utilized with the inventive apparatus.

Similar elements are designated by similar numerals throughout the drawing.

In FIG. 1, an embodiment of the inventive double resonance apparatus comprises a microwave signal source 10 which provides a microwave frequency signal to a cavity resonator 12 that contains a sample 14 to be analyzed. The cavity resonator 12 is located in a polarizing field $H_0$, which may be 3500 gauss for example, supplied by a magnet 16. The cavity may be of the wire wound type operating in the $TE_{011}$ mode, as described in copending U.S. patent application Ser. No. 184,285, filed Apr. 2, 1962, now issued as U.S. Patent 3,197,692 on July 27, 1965, and assigned to the same assignee. A low audio frequency oscillator 18 provides a low frequency modulating signal through a power amplifier 19 to a set of sweep coils 20 that are positioned in the air gap between the magnet pole members to modulate the field $H_0$ over a portion of the EPR line. The microwave signal source 10, which may be a klystron oscillator, generates a 10 kilomegacycles per second signal, for example, that is applied to the resonator 12 to excite the sample 14 at the characteristic Larmor precession frequency of the electrons ($\nu_e$).

The signal source 10 may be coupled to an automatic frequency control (AFC) circuit for the purpose of stabilization in a well-known manner.

The automatic frequency control, which serves to lock the klystron to the resonance of the sample cavity 12, thereby keeping the microwave cavity at microwave resonance, comprises a channel coupled to the output of the microwave detector 36. This AFC channel includes an amplifier 37 which amplifies the detected resonance signal and passes the amplified signal to a phase detector 39. At the same time, an oscillator 41 feeds a reference signal at an audio frequency, 10 kc. for example, to the phase detector 39 for comparison with the amplified detected signal. The oscillator 41 also provides a signal to frequency modulate the microwave source 10. A DC signal is developed and applied to the microwave source 10 to stabilize the microwave frequency to resonance.

However, as the cavity 12 is heated due to high radio frequency power, a shift away from magnetic resonance may occur. In such event, it is necessary to readjust the magnetic field in order to hold the detected signal or spectral trace at the center of resonance, and it is desirable to do this automatically. One way in which this may be accomplished is to dispose within the polarizing field $H_0$ a second microwave structure with a reference sample contained therein, said structure being coupled to the microwave source 10. The EPR signal from this reference sample may be used to derive an error signal which may be applied to the power supply of the magnet 16 in such a manner as to hold the magnetic field at the proper value for magnetic resonance to occur. To this end, a field frequency lock circuit, depicted in FIG. 4, is utilized with the inventive spectrometer, and includes a helix structure 64 that encompasses a reference sample 66 located within the polarizing field $H_0$. One end of the helix 64 is coupled to the microwave source 10 and the other end of the helix coil is coupled to a microwave detector 68. A set of modulating coils 70 is disposed adjacent to the sample and receives a modulating signal from the oscillator 72 through a power amplifier 74.

The detected signal received by the microwave detector 68 from the reference sample is amplified by amplifier 76 and fed to a phase sensitive detector 78 simultaneously with a reference signal from the oscillator 72. As a result, a DC error signal is derived from the phase detector and such DC signal is fed to a power supply 80 that supplies power to the magnet 16. In this manner, the intensity of the polarizing magnetic field may be varied in accordance with changes in frequency sensed by the helix 64 at the reference sample 66.

In accordance with this invention, a signal channel for exciting the sample to nuclear resonance includes a radio frequency oscillator 22 which has provision for modulation of the radio frequency by means of an externally applied voltage. An audio frequency signal, which may be 6 kc./sec., for example, derived from an oscillator 24 is employed to modulate the frequency of the oscillator 22. This results in an R.F. signal (FIG. 2A), the frequency of which varies periodically from 16.000 to 16,300 megacycles per second for example. The AF oscillator 24 also drives a trigger circuit 32, which generates trigger signals at a frequency twice that of the AF oscillator 24, said triggers being of suitable form to cause the pulse generator 34 to operate. The pulse generator 34 provides pulses (FIG. 2B) of variable amplitude, variable duration and variable delay, typical pulses in the present invention being 10 microseconds. The pulse generator 34 has typically a 12% duty cycle which avoids excessive cavity and sample heating. An R.F. amplifier 26 is turned on for the duration of each pulse generated by the pulse generator 34. The R.F. amplifier 26 amplifies the output of the R.F. oscillator 22, but only during the time that it is activated by the pulse generator 34. By proper adjustment of the delay of the pulses from the pulse generator 34, the R.F. amplifier 26 can be turned on at the times when the frequency of the R.F. oscillator 22 is a maximum and also when it is a minimum. This results in radio frequency pulses occurring at a rate twice that of the audio frequency oscillator 24, alternate pulses being at different frequencies. These pulses, appearing at the output of the R.F. amplifier 26 are applied to R.F. coils 28 to generate pulsed radio frequency magnetic fields at right angles to the DC polarizing field generated by the magnet 16, alternate pulses being at different frequencies.

The coils 28 provide an alternating magnetic field $H_2$ near the nuclear precession frequency that serves to induce nuclear or proton resonance of the sample. A frequency scanner 30 provides a signal to the R.F. oscillator 22 to sweep the frequency of this oscillator and to observe changes in the resonance condition, as is well known in the art.

The sample EPR and NMR or double resonance signals are detected by means of a microwave detector 36 that is coupled to the cavity resonator 12. The detected double resonance signal, which incorporates the 6 kc./sec. modulation and the low frequency modulation, which may be 20 c.p.s. for example, is amplified by a pulse amplifier 38 (FIG. 2C) and applied to a bandpass filter 40. The detected signal also includes noise that is produced by the microwave detector. The bandpass filter 40 rejects those frequencies greater than the inverse of the duration of the R.F. pulse from the pulse generator 34, which may be 10 microseconds, and also those frequencies less than the audio frequency from the oscillator 24, which in this case is 6 kc./sec.

The filtered signal is passed to a gating circuit 42, which is pulsed on and off at a 12 kc./sec. rate by a pulse generator 44 that is controlled by the pulse generator 34. The pulse generator 44 controls the width of the pulse supplied to the gate 42. The gate 42 is only open during the occurrence of the R.F. pulses, thereby effectively eliminating spurious transients and noise that may appear between the pulses (FIG. 2D). By means of the gate 42, an improvement in S/N ratio is evidenced in the apparatus described here that is in proportion to the square root of the ratio of the gate "off" period to the "on" interval, in contrast to an identical circuit which does not include a gating switch. The gated signal in the form of a square pulse is fed to a narrow band audio frequency amplifier 46 that rejects the 12 kc. pulses but passes an amplified 6 kc./sec. information carrying signal to a phase detector 48. In effect, alternate pulses are subtracted and the 6 kc. pulse signal is processed for detection.

The phase detector 48 receives a reference 6 kc. signal directly from the oscillator 24 for comparison with the 6 kc. information pulse signal and provides a low audio frequency output at a 20 c.p.s. rate. The 20 c.p.s. signal results from the low frequency 20 c.p.s. modulating of the DC field by the modulating coils 20. This 20 c.p.s. signal is amplified in a narrow band amplifier 50 and fed to a phase sensitive detector 52, which also receives a 20 c.p.s. reference signal from the oscillator 18 for comparison with the amplified output signal from the phase detector 48. As a result, a DC signal is derived which is utilized for recording and visual indication on a recorder and oscilloscope 54. This recorded signal represents the nuclear resonance which appears as a result of the interaction of the nuclei with the electrons of the sample.

An alternative embodiment of this invention is depicted in FIG. 3, wherein the R.F. oscillator 22 generates a frequency of 16.150 mc./sec., which is not frequency modulated as in the embodiment of FIG. 1. Furthermore, the output of the audio frequency oscillator 24 is fed directly to the pulse generator 34 which passes a 6 kc./sec. pulse to the R.F. amplifier 26. It is seen that the trigger circuit 32 and 12 kc. pulse (2$f$) are not utilized in this alternative embodiment for cancelling out noise signals. Instead, the 6 kc. pulses are directed to the pulse generator 44 which controls the pulsing of a transformer 56 that has one winding 58 coupled between the power amplifier 19 and the modulating coils 20; whereas the other winding 60 is connected to the pulser 44 at one end, and at the other end to a point of reference potential, such as ground. A capacitor 62 is shunt connected between the power amplifier 19 and the winding 58 to prevent the pulse from generator 44 from appearing at the amplifier 19.

The pulse signal from the generator 44 is of such polarity that the induced compensating field $H_c$ at the coil 20 opposes the polarizing field $H_0$ supplied by the magnet 16. The opposing or bucking field $H_c$ may be 0.1 gauss for a 3500 gauss polarizing field, by way of example. This bucking field $H_c$ substantially cancels any undesirable effects in the output detected by the receiver circuit arising from the shift in the apparent polarizing field caused by $H_2$. Specifically, in the absence of a bucking field $H_c$, the R.F. field $H_2$ at right angles to $H_0$ is equivalent to a shift in the applied field $H_0$; pulsing of the R.F. field a at rate of 6 kc. is equivalent to modulation of the field $H_0$ at a 6 kc. rate; and EPR signals are detected even though the radio frequency $\nu_2$ is not equal to the nuclear precession frequency $\nu_n$. Visual indication on the oscilloscope and recorder 54 affords adjustment of the recorder to eliminate the appearance and recording of any EPR signal, but allows a true NMR signal to be recorded. The field $H_c$ is pulsed synchronously with the occurrence of the detected NMR signal so that the correction is applied whenever the NMR signal is present. As an alternative, a sinusoidal modulation of the bucking field $H_c$ may be utilized, if the period of the sinusoidal waveform corresponds to the pulse rate from the oscillator 24.

The inventive apparatus allows the use of high R.F. power, in the order of 1 kilowatt for example, and R.F. fields having an amplitude of 100 gauss, without deterioration of the signal-to-noise ratio. Also, pulsing of the high power R.F. transmitter reduces the heating of the microwave cavity. A further advantage of pulsing the R.F. signal is that a larger field intensity may be obtained from the R.F. amplifier than if utilizing CW operations. The invention is applicable for the study and analysis of free radicals with strongly coupled protons in liquid, such as Coppinger's radicals in a solution of n-heptane. Thus, complex spectra for liquids may be interpreted and analyzed.

It is understood that the invention is not limited to the particular configuration, parameters or values, such as the signal frequencies, set forth above. For example, in lieu of pulsing the gate 42, the amplifier 46 may be turned on synchronously with the pulses from the generator 44. The invention is particularly useful in double resonance gyromagnetic apparatus wherein high radio frequency power may be utilized with an improved signal-to-noise ratio.

What is claimed is:

1. A gyromagnetic resonance apparatus for analyzing a sample, wherein the sample is disposed within a polarizing field comprising: means for inducing electron paramagnetic resonance transitions, coupled to said sample; means for producing a first train of pulses, at a predetermined rate, of radio frequency energy, said pulses being coupled to said sample for inducing nuclear magnetic resonance transitions; means for producing a second train of pulses at said predetermined rate, of radio frequency energy, said radio frequency being different from that of the first train, said pulses being coupled to said sample, the pulses of said second train occurring substantially midway between the pulses of said first train, the pulses of both trains being of substantially identical amplitude; means for sweeping the radio frequency of said first train and the radio frequency of said second train; means for detecting electron-nuclear double resonance transitions including means for sensing the double resonance signal at the predetermined pulsing rate; and means for utilizing the electron-nuclear double resonance signal.

2. A gyromagnetic resonance apparatus as in claim 1 wherein the detecting means includes a gate circuit that is pulsed to open coincidentally with the pulses of each train.

3. A gyromagnetic resonance apparatus as in claim 2 wherein said detection means further includes a band-pass filter; and a narrow band amplifier tuned to a frequency identical to the predetermined rate for amplifying the output signal from said gate circuit.

4. A gyromagnetic resonance apparatus as in claim 1 including means for providing a pulsed magnetic field to compensate for shifts in the polarizing field encompassing the sample, said magnetic field being pulsed in synchronism with the pulses of each train.

5. A gyromagnetic resonance apparatus for analyzing a sample comprising: means for inducing electron-nuclear double resonance transitions within the sample including, means for producing a train of discrete bursts of radio frequency energy in the sample at a certain predetermined repetition rate for exciting resonance of the nuclei of the sample; means for sweeping the average frequency of the radio frequency energy through the resonance frequency of the sample at a second predetermined rate lower than said first certain repetition rate; means for causing the bursts of radio frequency energy to alternate in frequency above and below the average frequency while the average frequency is being swept; and means for detecting the electron-nuclear double resonance transitions.

6. A gyromagnetic resonance apparatus wherein a sample is disposed within a polarizing field comprising: means for inducing electron paramagnetic resonance transitions within said sample; means for producing a train of discrete pulses of radio frequency energy in the sample at a certain predetermined repetition rate to induce nuclear magnetic resonance transitions within said sample; means for detecting electron-nuclear double resonance transitions, including means for detection of the electron paramagnetic resonance transitions, said detection means producing an electron paramagnetic resonance signal; means for detection of variations of said paramagnetic resonance signal at the predetermined repetition rate and including a gate circuit pulsed in synchronism with said train of radio frequency pulses at said predetermined repetition rate; and means for utilizing the electron-nuclear double resonance signal.

7. The apparatus according to claim 6 wherein said means for producing the train of discrete pulses of radio frequency energy includes a pulsed radio frequency transmitter supplying a pulsed radio frequency magnetic field to the sample at right angles to the polarizing magnetic field and further including; means for providing a pulsed polarizing magnetic field component to compensate for variations in the effective polarizing field encompassing the sample produced by the train of radio frequency pulses, said polarizing magnetic field being pulsed at the predetermined repetition rate.

8. The apparatus according to claim 6 including; means for scanning the ratio of polarizing field strength to frequency of the radio frequency energy for scanning the nuclear magnetic resonance spectrum of the sample.

9. The apparatus according to claim 8 including; a cavity resonator having the sample disposed therein and located in the polarizing magnetic field; and wherein said means for inducing electron paramagnetic resonance transitions within the sample includes, a microwave source; and means forming an automatic frequency control circuit for stabilizing the frequency of said microwave source through the resonance frequency of said cavity resonator.

10. The apparatus according to claim 9 including; means for immersing a control sample, which is separate from said sample under analysis, in the polarizing magnetic field; means for applying an alternating magnetic field derived from said microwave source to the control sample to excite resonance thereof; and means responsive to the resonance of the control sample for controlling the intensity of the polarizing magnetic field to obtain a controlled ratio of the frequency of said microwave source to the intensity of the polarizing magnetic field.

11. A gyromagnetic resonance apparatus according to claim 10 including; means for modulating said polarizing magnetic field applied to said sample cavity; and said detecting means including a phase sensitive detector at said polarizing field modulation frequency.

References Cited
UNITED STATES PATENTS

| | | | |
|---|---|---|---|
| 3,034,040 | 5/1962 | Williams | 324—0.5 |
| 3,090,003 | 5/1963 | Rempel | 324—0.5 |

OTHER REFERENCES

Aisenberg et al., Physical Review vol. 116, No. 4, November 15, 1959, pp. 811–818 incl.

Doyle, The Review of Scientific Instruments, vol. 33, No. 1, January 1962, pp. 118 and 119.

Feher, Physical Review vol. 114, No. 4, June 1, 1959, (pp. 1219 and 1221–1224 principally relied on).

Holton et al., Physical Review, vol. 125, No. 1, January 1962, (pp. 89–96 principally relied on).

Waugh, Annals of the New York Academy of Sciences, vol. 70, art. 4, June 16, 1958, pp. 920–922 inclusive.

Webb, The Review of Scientific Instruments, vol. 33, No. 7, July 1962, pp. 732–737.

RUDOLPH V. ROLINEC, *Primary Examiner.*

MAYNARD R. WILBUR, *Examiner.*

M. J. LYNCH, *Assistant Examiner.*